June 13, 1967
L. Z. MICAI ET AL
3,324,511
APPARATUS FOR MOLDING LEATHER SEALING MEMBERS
Filed Feb. 3, 1964
5 Sheets-Sheet 1
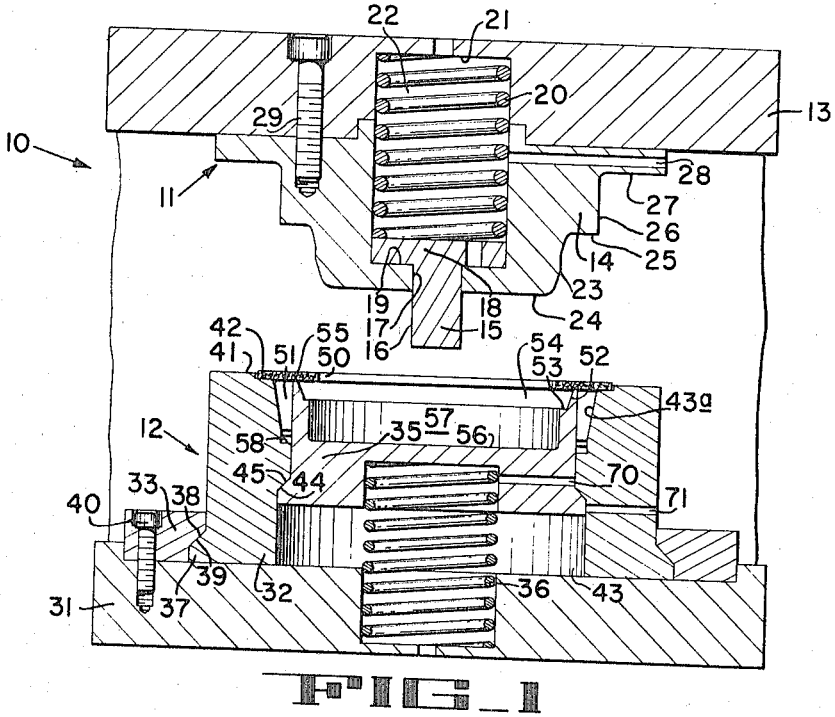
FIG_1
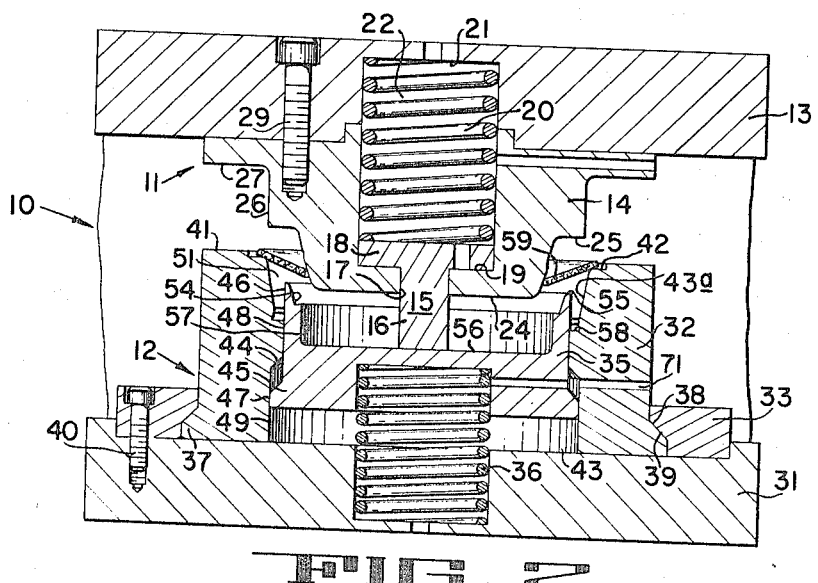
FIG_2
INVENTORS
ANDREW M. SEEMANN
LOUIS Z. MICAI
BY *A. Donham Owen and Robert Wickersham*
ATTORNEYS June 13, 1967 L. Z. MICAI ET AL 3,324,511
APPARATUS FOR MOLDING LEATHER SEALING MEMBERS
Filed Feb. 3, 1964 5 Sheets-Sheet 2
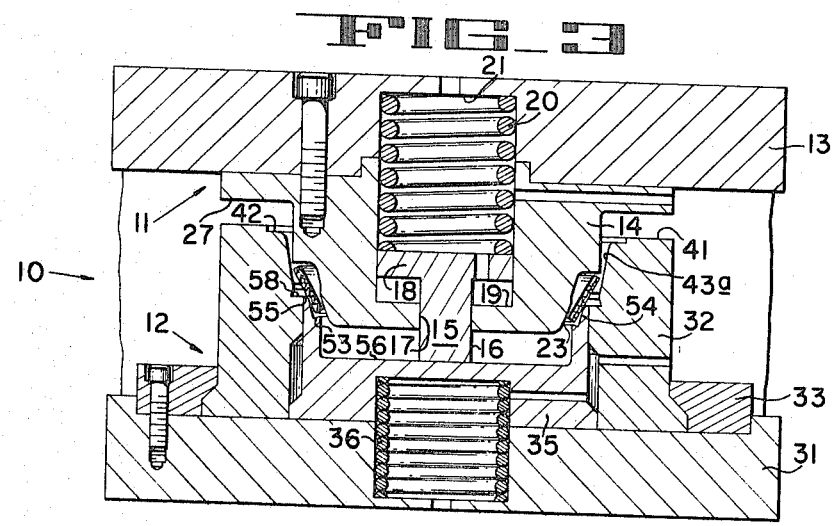
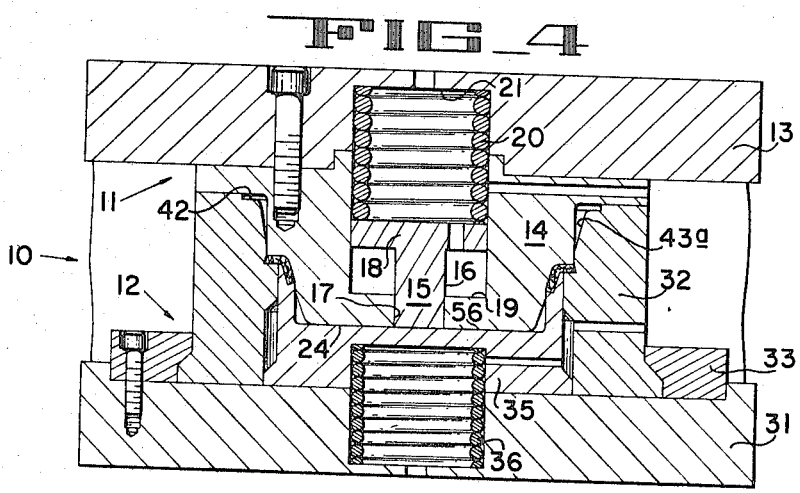
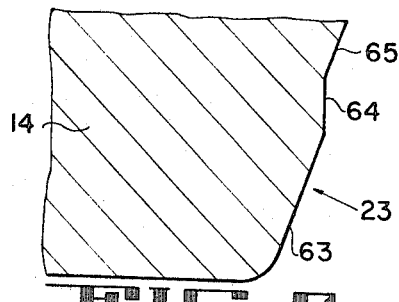
INVENTORS
ANDREW M. SEEMANN
LOUIS Z. MICAI
ATTORNEYS

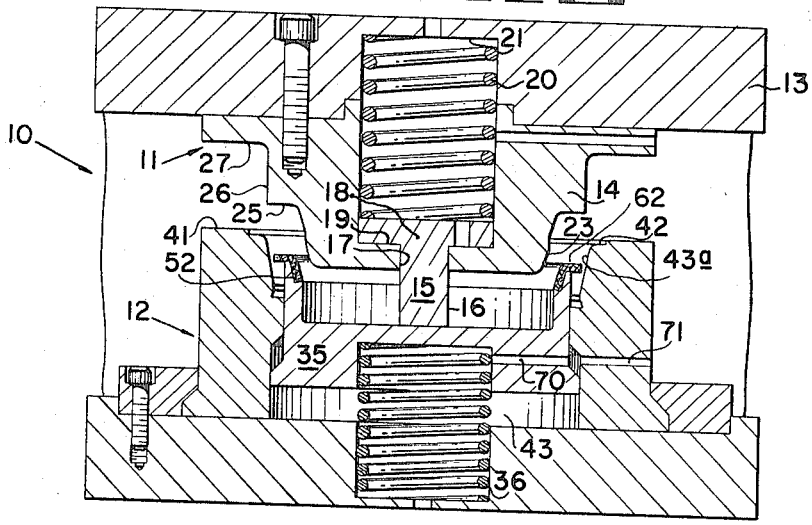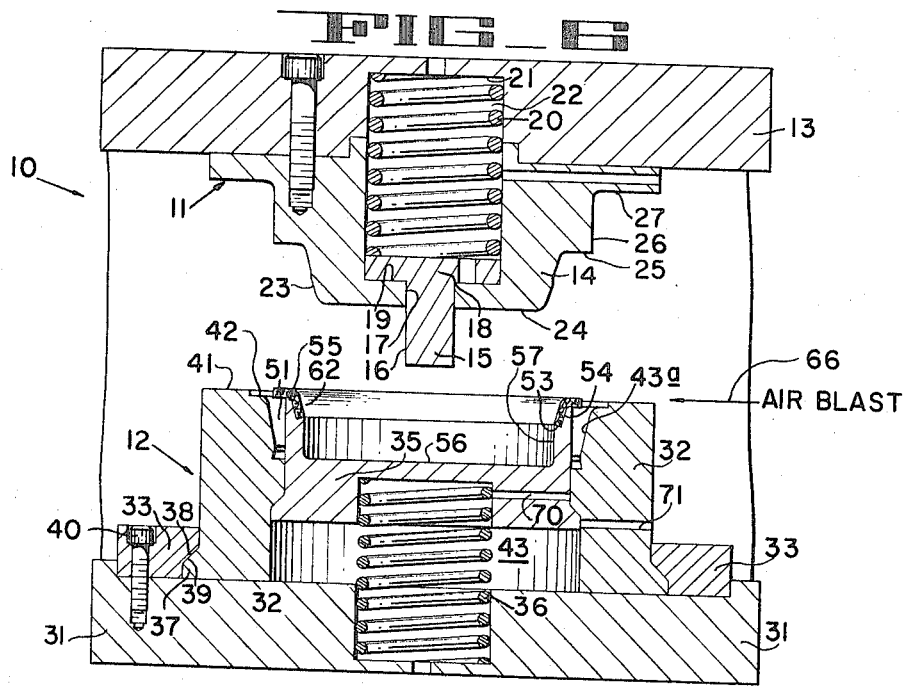

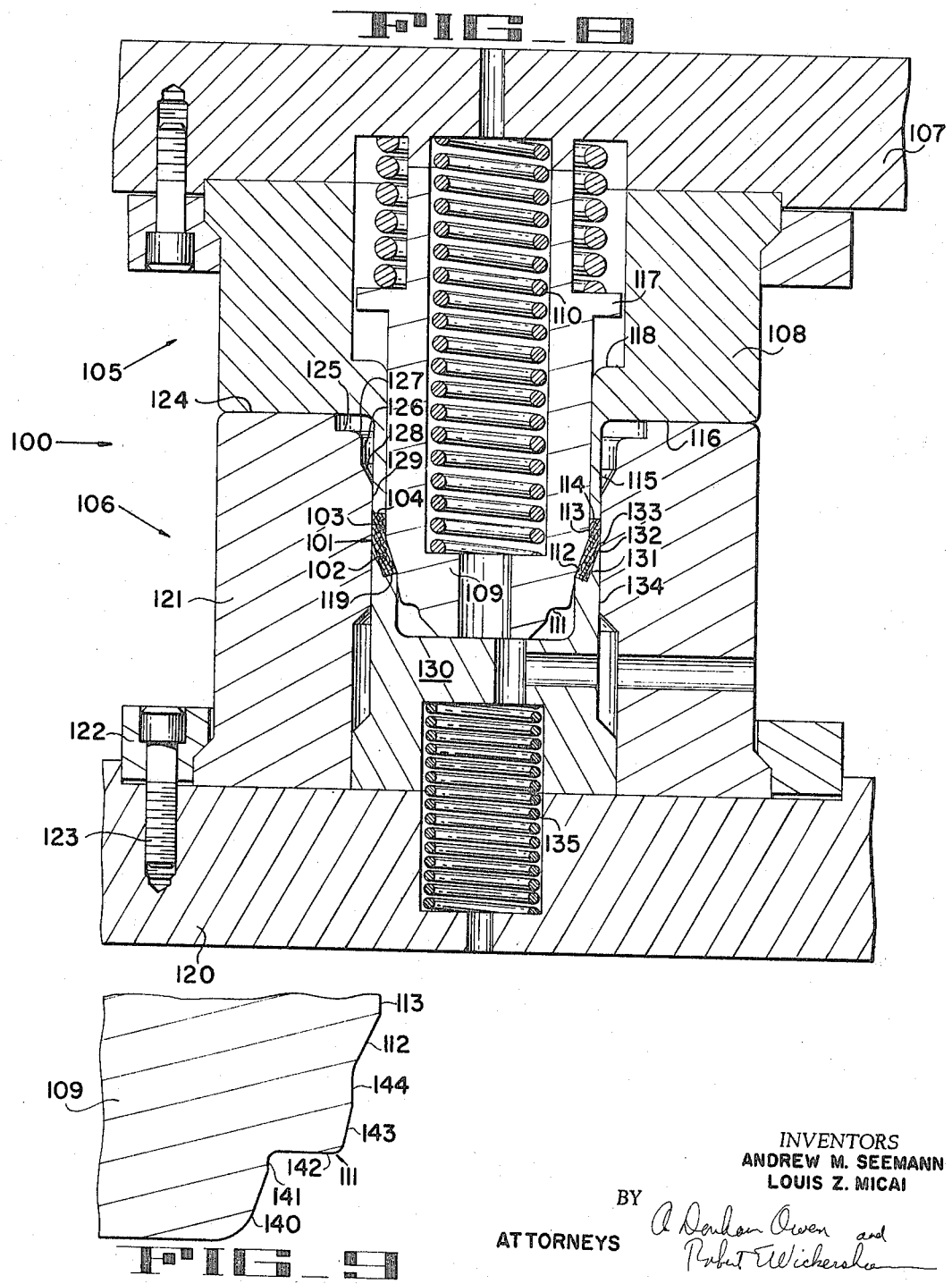

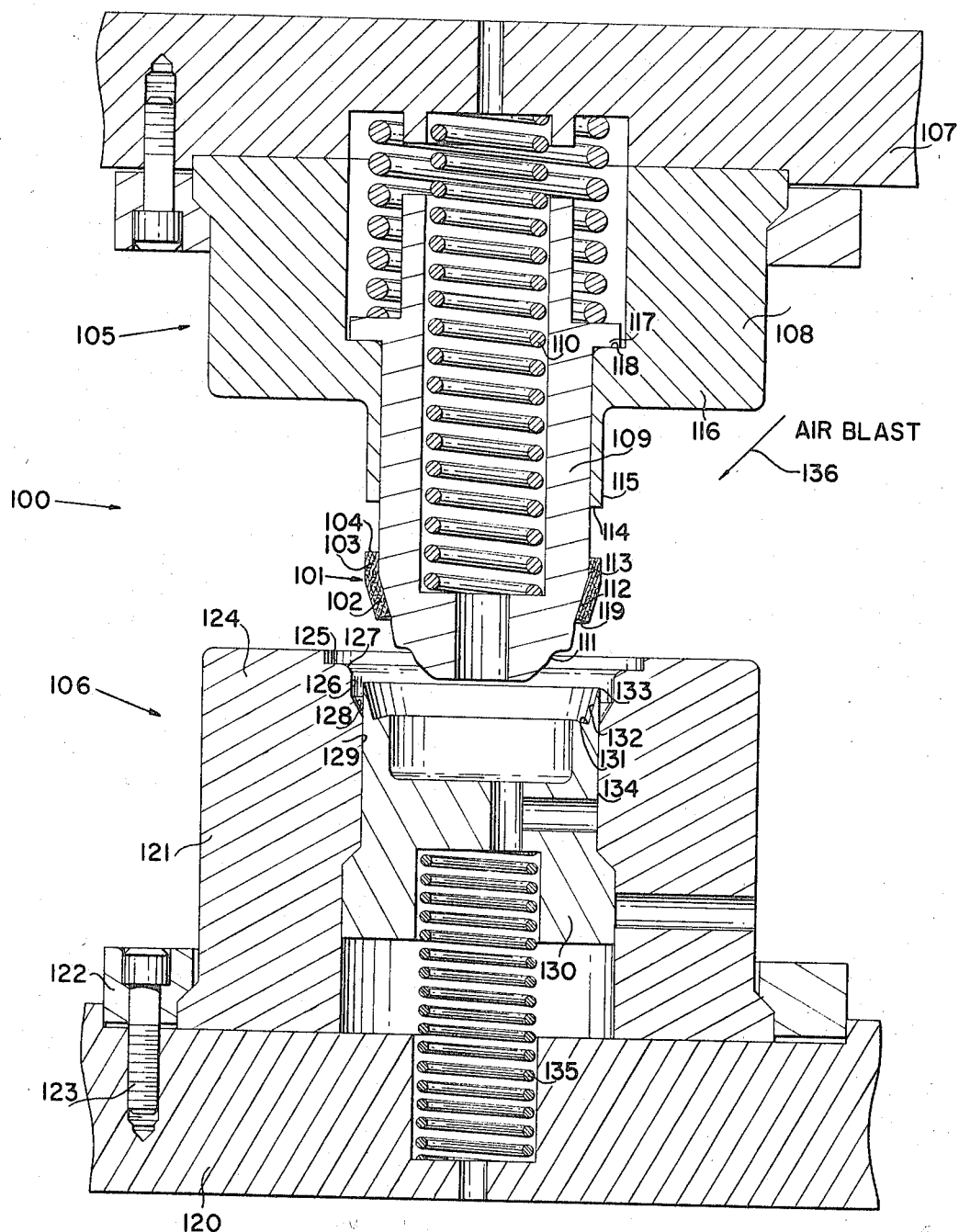

United States Patent Office 3,324,511
Patented June 13, 1967

3,324,511
APPARATUS FOR MOLDING LEATHER SEALING MEMBERS
Louis Z. Micai, Portola Valley, and Andrew M. Seemann, Sunnyvale, Calif., assignors to Federal-Mogul Corporation, a corporation of Michigan
Filed Feb. 3, 1964, Ser. No. 342,097
10 Claims. (Cl. 18—19)

This invention relates to an improved apparatus for molding leather and more particularly for molding annular leather lubricating sealing members.

Leather sealing members for oil and grease seals have normally been made by first molding or otherwise shaping a leather disk or ring to provide a lip portion and a support portion, and then trimming off the inner and outer peripheries, usually by a knife, to define the inner sealing lip edge and the outer edge of the anchoring portion. In some instances, the attempt was made to avoid trimming by pinching off the peripheries during molding, and in a few instances attempts have been made to mold the seals to size from pre-cut annular blanks, but heretofore these procedures have not proven satisfactory for large production runs, primarily because of the number of rejected pieces that have resulted. A difficulty with molding the lips from pre-cut blanks was that the molds tended to pinch off portions of the leather, and in an irregular, unpredictable manner, so that while some parts were accurately made, many other parts were quite unsatisfactory and had to be discarded.

An object of this invention is to provide a mold which rapidly and accurately manufactures leather sealing elements from pre-cut leather washers, doing so without any trimming being required during the molding process or afterwards and doing so without pinching off peripheral portions.

An advantage of the invention is that it saves leather. Conventional operations, which relied on trimming for providing the final lip shape, resulted in pulling in the leather outer periphery unevenly or elliptically; hence, extra leather had to be used in order for a cylindrical trim to be obtained. The trimmed-off margin around the outer periphery has typically been ¼" to ½" wide, and this entire margin was waste. The present invention eliminates these margins and the blanks can be spaced next to each other. Hence, the leather blanks for the seals can be made smaller, and more seals can be made per hide.

Trim operations tended to become inaccurate for a variety of reasons, such as careless setup by the operator, improper trim button fit, and the condition of the trim knife—even a sharp knife normally left a burr, and dull knives left worse burrs; moreover, dull knives were common because it was common for the knives not to be changed often enough. In the present invention the trim operation is eliminated, and the blanks are punched out swiftly and accurately with precise inner and outer peripheries.

Conventional leather molds were hand-aligned, the operator obtaining alignment by tapping them with a lead hammer. The mold of this invention is self-aligning. The dimensions of the product made by this invention are also more stable than those of prior art seals, since the distortions due to stresses inherent in hat-type molds are not present.

Other objects and advantages of the invention will appear in the following description of a preferred form of the invention.

In the drawings:

FIG. 1 is a view in elevation and in section of an apparatus embodying the principles of the invention and comprising a mold for leather washers, shown in its open position.

FIG. 2 is a view similar to FIG. 1 showing the mold as it begins to close, with a spring-urged stud carried by the upper half of the mold depressing a weaker spring-urged lower mold half.

FIG. 3 is a similar view showing the mold in the next state, in which the lower mold half has been fully depressed, and the stud itself is being urged upwardly against its spring.

FIG. 4 is a similar view of the mold in its fully closed or curing position.

FIG. 5 is a similar view, showing the mold as it begins to open and has reached the position where the lower spring has once again pushed up the spring-loaded lower mold half and the upper spring has begun to separate the relatively movable parts of the upper half of the mold.

FIG. 6 is a similar view, showing the mold in its fully opened position with the molding completed.

FIG. 7 is an enlarged fragmentary view of the bottom right-hand portion of the upper mold half.

FIG. 8 is a view similar to FIG. 4 of a modified form of the invention for making a so-called barrel type of annular sealing element, with the mold shown in its closed position.

FIG. 9 is an enlarged fragmentary view of the bottom right-hand portion of the upper mold half of FIG. 8.

FIG. 10 is a view like FIG. 8 with the mold open most of the way.

In general, the invention uses a novel method of molding an annular sealing element 50 or 101 having a frusto-conical lip 60 or 102 from a flat leather washer. In this method an outer marginal portion of the washer is loosely supported and the inner periphery is forced down while stretching it radially outwardly and widening the inner periphery, so that an inner marginal portion assumes a frusto-conical shape. At the same time, the outer periphery is pulled in. The inner periphery is forced out to a predetermined inner diameter while continuing to shape it, and the washer is clamped and molded in the desired shape at the predetermined diameter. The forcing and shaping is done by inserting through the inner periphery of the washer a tapered portion of a mold member with an initial portion smaller than the opening through the washer and widening out to a greater width, so as to force the inner portion of the washer in the same direction while its outer margin is being held on a loose support, putting it into the frusto-conical shape. Continued forcing of the tapered portion stretches the inner periphery to a predetermined size while simultaneously pulling in the outer periphery. The tapered portion is succeeded by a cylindrical mandrel portion having the predetermined diameter to which the inner periphery of the washer is to be stretched. This cylindrical portion, in turn, is succeeded by a frusto-conical portion which holds the inner portion of the washer in the desired shape while molding it there under pressure. The outer portion may be flat (FIGS. 1–7) or cylindrical (FIGS. 8–10) depending on the type of oil seal being made. The process will be better understood by noting the structure of the molds and their operation, and these will therefore be described now.

The mold 10 shown in FIGS. 1 through 7 comprises an upper mold assembly 11 and a lower mold assembly 12. These assemblies are suitably mounted in the usual press which applies the desired pressure and closes the mold 10.

The upper mold assembly 11 comprises a mold platen 13, an upper mold-half 14, and a spring-loaded stud 15. A stem portion 16 of the stud 15 protrudes through a recess or opening 17 in the bottom of the upper mold-half 14, and its head 18 rests on a shoulder 19 of the mold-half 14. A spring 20, confined between the stud head 18 and an upper end wall 21 of an upper recess portion 22 in the upper mold platen 13, urges the stud 15 downwardly and normally seats the head 18 against the shoulder 19. The upper mold-half 14, which is rigidly secured to the mold platen 13 by bolts 29, has a configurated seal-molding portion 23 that will be discussed in detail later; this portion 23 extends generally frusto-conically between a lower annular end 24 of the mold-half 14 and an upper annular shelf 25 that is joined by a cylindrical portion 26 to a flat outer rim 27. The upper mold-half 14 also has an air-release or venting passage 28.

The lower mold assembly 12 includes a mold platen 31, a mold base 32 mounted thereon, a ring 33 holding the base 32 in place, and a spring-loaded lower mold-half 35, whose spring 36 is of lighter pressure than the spring 20 in the upper mold assembly 11. The base member 32 preferably has an annular outer rim portion 37 with a frusto-conical bearing wall 38 against which a frusto-conical bearing portion 39 of the hold-down ring 33 engages, and bolts 40 secure the hold-down ring 33 (and therefore the base member 32) to the platen 31. The mold base 32 has a flat upper end 41 which is recessed to provide an annular shelf 42 that locates and helps to support the leather washer 50 which is to be molded. The mold base 32 also is provided with a central well 43 having, successively, an upper tapered inner periphery 43a, an upper cylindrical portion 48, a frusto-conical step 44, and a lower wider cylindrical portion 49.

The lower mold-half 35 is provided with a frusto-conical step 45 matching the step 44 of the base, and connecting inner and outer cylindrical peripheries 46 and 47. The peripheries 46 and 47 match the cylindrical inner peripheral portions 48 and 49 of the well 43, which are joined by the step 44, and these surfaces guide the vertical movement of the lower mold-half 35 in the well 43 when it is urged down by the stud 15 against the pressure of the spring 36 during closure of the mold 10. Preferably, the spring-mounted lower mold-half 35 is spaced radially inwardly away from the upper tapered portion 43a of the well 43 by a gap 51.

The upper end of the spring-loaded lower mold-half 35 is provided with a leather shaping and molding section 52 that bounds the lower part of the mold cavity. This section 52 comprises an inclined lower shelf 53 and an inclined side wall 54. The upper end 55 of the section 52 is flat, and when the steps 44 and 45 bear against each other the flat end 55 is level with the recessed shelf 42 of the base 32. This is the extreme upper position of the lower mold-half, to which it is urged by the spring 36. Below the shelf 53, a cylindrical portion 57 leads to a flat bottom wall or web 56. When the lower mold-half 35 is fully bottomed on the plate 31 it is in its extreme lower position, and then the end 55 is level with a shelf 58 at the lower end of the tapered portion 43a. Vent passages 70 and 71 are provided respectively in the lower mold-half 35 and the mold base 32.

The understanding of the principles involved can now best be explained by following through the cycle of operations shown in FIGS. 1 through 6.

In FIG. 1, a leather washer 50, which was punched out to an exact size with precise inner and outer peripheries, has been placed on the upper end 55 of the lower mold-half 35 and on the annular support shelf 42, which in this position of the mold 10 is level with the end 55. The upper mold assembly 11 is about to be lowered, and its stud 15 is fully projected by the spring 20.

As the mold 10 closes, the stud 15 comes against the central surface or web 56 of the lower mold-half 35 and begins to move the lower mold-half 35 down into the well 43, as shown in FIG. 2, since the lower spring 36 is of lighter weight than the upper spring 20, and therefore yields to it. As the lower mold half 35 moves down, compressing the spring 36, the shelf 42 provides for awhile all the support for the leather washer 50, and the entire inner portion of the leather washer 50 is free. Upon further downward movement of the upper mold assembly 11, the upper mold-half 14 comes into contact with the inner periphery 59 of the leather washer 50 and to begin to force it down evenly into a frusto-conical shape which, at this stage, is of different taper than either mold-half 14 or 35. This is shown in FIG. 2, which also shows that the loosely supported outer portion of the washer 50 is being pulled in due to this action.

The stud 15 continues to push the lower mold-half 35 down toward the platen 31 until the lower mold-half 35 is fully bottomed in the well 43 on the platen 31, as in FIG. 3. This places the lower mold-half 35 in its molding position with its upper end 55 level with the shelf 58 of the lower mold base 32. With the lower mold-half 35 bottomed, the stud 15 beings to compress its spring 20 as the upper mold-half 14 continues to descend. Now, instead of simply moving parallel to and at the same rate as the lower mold-half 35, the upper mold-half 14 continually moves closer to the lower mold-half 35 and therefore begins to close the mold cavity, drawing the leather washer 50 on the mold-half 14 as it does so.

Mold closing continues until the fully bottomed, fully closed position shown in FIG. 4 is reached, where the bottom 24 of the upper mold-half 14 rests on the web 56 of the lower mold-half 35, to distribute molding pressure, and the rim 27 of the upper mold-half 14 is seated on the upper end 41 of the lower mold base 32. The leather washer 50 is confined between the upper mold-half 14 and the lower mold-half 35, and the closed mold cavity defines a frusto-conical sealing lip 60 of the seal, while a flat flange 61 is enclosed between the upper end 55 of the lower mold half 35, the shelf 58 of the lower mold base 32, and the shelf 25 of the upper mold-half 14. This is the final shape of the leather sealing member 62. As noted earlier, the leather washer 50 was punched to an exact size beforehand so that it fits perfectly into this new shape, having been drawn to it by the mold 10.

During the shaping of the washer 50 to the sealing element 62, from FIG. 2 to FIG. 4, the configuration 23 of the upper mold-half 14 is very important. It is shown more clearly in the enlargement, FIG. 7. The shape 23 assures proper passage of the leather washer 50 into the mold cavity as the mold closes and helps to prevent pinching off and misalignment. A tapered surface 63 first engages the inner surface 59 of the washer 50 and assures centering of the washer 50 in the mold cavity as the taper 63 moves down. The taper 63 ends at a short cylindrical portion 64. As the inner periphery 59 of the washer 50 slides against the tapered surface 63, it is forced downward and dilated until it assumes its molded diameter, which is the same as that of the cylindrical portion 64. Then the washer 50, as it is shaped further, slides over the short cylindrical portion 64 and comes to rest against the actual mold surface 65, which is tapered or frusto-conical to match the desired slope of the lip 60.

Normally, the leather washer will have been coated, preferably on both surfaces but not on the edges, as provided in U.S. Patent 2,845,267, to provide a low-friction elastomeric coating, and this elastomeric coating helps the molding process by providing surfaces that have minimum friction characteristics so that the washer can slide over the configuration 23. Of course, it is possible to mold the leather without any such treatment so that it will be pre-shaped, but it is normally preferred to have the elastomeric coating on, and when that is present, the mold 10 is heated in the normal way and it remains closed until the leather is assured of retaining its molded shape.

When the molding operation has been completed the mold 10 opens, the parts moving in the reverse order from which they moved during the closing of the mold. FIG. 5 shows the position occupied when the stud 15 has again become fully retracted and when the upper mold half 14 has moved up enough so that the spring 36 can push the lower mold-half 35 part of the way up. The finished molded member 62 is being moved upwardly, carried by the lower mold-half 35.

When the position of FIG. 6 is reached the mold 10 is again in its open position, and the finished article 62 can be ejected, as by an air blast 66. Some of the air from this blast goes into the gap 51 between the lower mold-half 35 and the lower mold base 32 and gets under the flange 55, lifting the seal 62 from the lower mold-half 35. Then a new element can be placed into the mold 10.

A modified mold 100 of the invention is shown in FIG. 8. This mold is used to solve a particularly difficult problem, that of manufacture of so-called "barrel-shaped" leather sealing members 101 having a frusto-conical lip 102 succeeded by an axially extending cylindrical anchor portion 103. The manufacture of seal elements of this type is generally considered to be much more difficult than that of elements like the seal 60. The difficulty is that the leather has had to be forced down into the mold by pushing on the upper edge 104, for there is no large flange by which to push it. However, the present invention makes it possible to make such seals 101 just as easily as those of the type shown in FIGS. 1–6.

Basically, the mold 100 is like the mold 10, with the exception of the shape of the mold cavity and the length of some of the portions. The mold 100 includes an upper mold assembly 105 and a lower mold assembly 106. The upper mold assembly 105 comprises a mold platen 107, an upper mold ring 108, and a spring-loaded upper mold-half 109 which is projected out through the mold ring 108 by a spring 110. The upper mold half 109 has a configurated portion 111, which is succeeded by a tapered molding portion 112, and this is followed by a cylindrical portion 113, the lower portion of which defines part of the mold cavity while the upper portion extends up through the mold ring 108. A radial horizontal molding portion 114 of the mold ring 108 engages the upper edge 104 of the leather. A cylindrical portion 115 is succeeded by an annular flat radial portion 116. The upper mold-half 109 has a collar 117 for engagment of the shoulder 118 on the ring 108 and for engagement of the spring 110.

The lower mold assembly 106 includes a mold platen 120, a mold base 121, and a hold-down ring 122 with bolts 123 which operate as in the mold 10. The mold base 121 has an upper end 124 upon which portion 116 of the upper mold half 108 seats when the mold 100 is in the fully closed position shown in FIG. 8. The base 121 has a shelf 125 upon which the leather washer is seated when the mold 100 is open, before operation, and from which it is pulled away during the molding operation. The interior well of the base 121, instead of being tapered, has a cylindrical wall 126 joined by a curved edge 127 to the shelf 125, and the wall 126 is succeeded by a tapered portion 128 that leads into a cylindrical portion 129.

The lower mold assembly 106 also includes a lower mold-half 130 which is basically like the member 35 discussed earlier and has, for molding purposes, a shelf 131 that receives the lower edge 119 of the leather element 101 during the molding; the shelf 131 meets an inclined portion 132 which ends in a rather sharp point at the upper end 133. There is a good close fit between the outer periphery 134 of the lower mold-half 130 and the cylindrical periphery 129 of the well in the mold base member 121. The lower mold-half 130 is mounted on a spring 135 which is lighter than the spring 110.

The configuration 111 of the upper mold-half 109 is an important feature of this invention and is shown more clearly in the enlargement, FIG. 9. The shape 111 assures passage of the leather washer into the mold cavity as the mold closes. A tapered surface 140 first engages the inner surface of the washer 101 and assures centering of the washer in the mold cavity as the taper 140 moves down. The taper 140 leads by a short cylindrical portion 141 to a narrow ledge 142, and as the inner periphery of the washer 101 slides against the ledge 142, the upper mold-half 109 is enabled by the ledge 142 to hold the washer 101 more firmly during the initial closing movement. Then the washer 101 slides by the ledge 142 onto the tapered portion 143 and moves up a short cylindrical portion 144 to come against the actual mold surface 112, which is tapered to match the desired slope of the lip. Note that the portions 143, 144 and 112 correspond to the portions 63, 64 and 65 of the mold 10.)

Sequential operation of the mold 100 is substantially the same as that of the mold 10, and the order of operation is substantially the same. However, in addition to forming the frusto-conical portion 102, the prepunched leather washer is pulled down along the inner peripheral surfaces 126, 128, and 129 of the mold base member 121 into an axially extending cylindrical portion 103, and then its upper edge 104 is engaged by the upper mold-half 108 when the portion 116 seats against the surface 124 of the lower mold base 121. When the mold 100 is opened (FIG. 10), an air blast 136 is introduced at the angle shown to strip the finished seal 101 from the mold member 109.

To those skilled in the art to which this invention relates, many additional changes in construction and widely differing embodiments of the invention will suggest themselves without departing from the spirit and scope of the invention as defined in the claims.

What is claimed is:

1. A device for molding a flat leather washer into a shape having an inner frusto-conical lip portion and an outer anchor portion, comprising
    (1) a lower mold assembly, having
        (a) a stationary portion with a generally cylindrical well having an annular upper end with flat annular support means for the outer margin of said washer, and
        (b) a lower mold-half yieldably mounted under pressure in said well and having an annular frusto-conical lip-molding surface and a short edge-molding surface, said lower mold-half being movable vertically in said well between an upper position where its upper end is level with said support means and a lower position where said lower mold-half is bottomed in said well, and
    (2) an upper mold assembly having
        (a) an annular outer member having a downwardly extending inner portion with a central recess and a surrounding annular shelf, and
        (b) an inner member yieldably mounted in said recess under greater pressure than that under which said lower mold-half is mounted and having a lower portion projecting out through said recess for engagement with said lower mold-half so as to force said lower mold-half down during mold closure,
            one of said members having first and second tapering side wall portions flaring upwardly and radially outwardly and separated by a cylindrical portion wider than said washer's inner diameter, said second tapering portion being a molding surface on the opposite side of the washer from said lip-molding surface during molding.

2. A device for molding a flat leather washer into a sealing ring or the like having an inner frusto-conical lip portion and an outer anchor portion, comprising
    (1) a lower mold assembly, having
        (a) a stationary base portion with a central well and an annular upper end with a flat annular shelf for initial support of the outer margin of said flat washer,
        (b) a lower mold-half slidable vertically in said well between two extreme positions and having a central web and an annular rim extending up from said web to an upper end and providing there an interior frusto-conical lip-molding surface terminating at its lower end in a short edge-molding surface, said two extreme position being an upper position where the upper end of said rim is level with said shelf, for partial initial support of said leather washer, and a lower position where said lower mold-half is bottomed on said base, and (c) a first spring in said well between said base and said web, urging said lower mold-half normally to its said upper position, and (2) an upper mold assembly having (a) an outer annular upper mold member having a central recess, (b) an inner upper mold member mounted in said recess and projecting out therethrough, and (c) a second spring heavier than said first spring and mounted between said outer and inner mold members and urging said inner mold member downwardly, one of said upper mold members having a first tapering portion leading upwardly and radially outwardly to one end of a straight cylindrical portion wider in diameter than the inner periphery of said washer and a second tapering portion leading upwardly and radially outwardly from the other end of said cylindrical portion and providing a frusto-conical lip-molding portion, said outer upper mold member having a molding portion engaging an outer portion of said washer when said mold closes, said inner upper mold member engaging said web during mold closure and depressing said lower mold-half against said first spring until said lower mold-half bottoms, said outer upper mold member then moving down relative to said upper inner mold member against the pressure of said second spring to close a mold cavity with the frusto-conical lip-molding portions opposite each other, and so that during mold closure said upper mold assembly engages said washer and smoothly and evenly forms it into a conical shape prepared for full closure of said mold cavity.

3. A device for molding a flat leather washer into a sealing ring or the like having an inner frusto-conical lip portion and an outer anchor portion, comprising an upper mold assembly and a lower mold assembly, said lower mold assembly having a stationary base portion with a central generally cylindrical well and an annular upper end with a recessed radially inner rim having a flat annular shelf for initial support of the outer margin of said washer, the inner diameter of said rim being larger than that of said washer, a portion of said well defining a portion of a mold cavity spaced below said shelf, a lower mold-half slidable up and down in said well and having a central web portion and an annular rim portion extending up therefrom to an upper end and having an interior frusto-conical lip-molding surface of said cavity and a short edge-molding surface perpendicular to and radially within said lip-molding surface of said cavity, said lower mold-half being movable vertically in said well between two extreme positions, an upper position where said upper end of the lower mold-half is level with said shelf, for partial initial support of said leather washer, and a lower position where said lower mold-half is bottomed on said base in said well, and a first spring in said well between said base and said web urging said lower mold-half normally to its upper position, said upper mold assembly having an outer annular upper mold member having a central stepped recess therethrough and an outer periphery providing an outer annular shelf and a downwardly axially extending portion, an inner upper mold member mounted in said recess and having a lower portion projecting out therethrough, a second spring heavier than said first spring and urging said inner upper mold member downwardly away from said outer annular upper mold member, one of said upper mold members having a first tapering portion leading upwardly and radially outwardly from a lower portion thereof to a straight cylindrical portion wider than the inner diameter of the washer, and a second portion tapering upwardly and outwardly from the other end of said cylindrical portion, and providing a frusto-conical molding portion of said cavity, so that as said mold closes, said inner upper mold member engages said web and depresses said lower mold-half against said first spring until said lower mold-half bottoms and then said outer upper mold member moves down relative to said inner upper mold member and closes the mold cavity with the frusto-conical molding portions opposite each other, and so that during closing said first tapering portion engages said washer and spreads it into a conical shape that is evened up at said cylindrical portion, beyond which it is pulled to full enclosure in the mold cavity.

4. The device of claim 3 wherein said base portion has a second smaller-diameter flat annular shelf spaced between the first-mentioned shelf in said well, the upper end of said lower mold-half being level with said second shelf when said lower mold-half is in its said lower position.

5. The device of claim 4 wherein the well is tapered between said first-mentioned shelf and said second shelf.

6. A device for molding a flat leather washer into a shape having an inner frusto-conical lip portion and an outer flat annular anchor portion, comprising (1) a lower mold assembly, having (a) a stationary portion with a generally cylindrical well having an annular upper end with a first flat annular support means for the outer margin of said washer and a second smaller-diameter flat annular support means spaced below said first support means in said well, and (b) a lower mold-half yieldably mounted under pressure in said well and having an annular frusto-conical lip-molding surface and a short edge-molding surface, said lower mold-half being movable vertically in said well between an upper position where its upper end is level with said first support means and a lower position where said lower mold-half is bottomed in said well and its said upper end is level with said second support means, and (2) an upper mold assembly having (a) an annular outer molding member having a central recess bordered by downwardly extending inner portion and a surrounding annular shelf, and (b) an inner stud yieldably mounted in said recess under greater pressure than that under which said lower mold-half is mounted and having a lower portion projecting out through said recess for engagement with said lower mold-half so as to force said lower mold-half down during mold closure, the inner portion of said molding member having first and second tapering side wall portions flaring upwardly and radially outwardly and separated by a cylindrical portion wider than said washer's inner diameter, said second tapering portion being a molding surface on the opposite side of the washer from said lip-molding surface during molding.

7. A device for molding a flat leather washer into a sealing ring having an inner frusto-conical lip portion and an outer flat anchor portion, comprising
(1) a lower mold assembly having
(a) a stationary portion with a generally cylindrical well and an annular upper end having a recessed first flat annular shelf for initial support of the outer margin of said washer and a second smaller-diameter flat annular shelf spaced below said first shelf in said well,
(b) a lower mold-half slidable up and down in said well and having an upper end and a frusto-conical lip-molding surface and a short lip-edge molding surface, said lower mold-half being movable vertically between an upper position where its said upper end is level with said first shelf, and a lower position where said lower mold-half is bottomed in said well and its said upper end is level with said second shelf, and
(c) a first spring in said well compressed between said base and said lower mold-half and urging said lower mold-half normally to its upper position, and
(2) an upper mold assembly having
(a) an upper mold-half with a stepped recess therethrough, a flat bottom, and an outer periphery providing a lower tapering portion flaring upwardly and outwardly from a diameter smaller than the inner diameter of said washer to a cylindrical portion wider than said washer's inner diameter, an upper frusto-conical molding portion above said cylindrical portion, and a flat upper molding portion,
(b) a stud mounted in said recess and having a lower portion projecting out therethrough, and
(c) a second spring heavier than said first spring and urging said stud downwardly away from said upper mold-half,
said stud engaging said lower mold-half as said mold closes, and depressing it against said first spring until said lower mold-half bottoms, said upper mold-half then moving down relative to said stud and closing a mold cavity with said frusto-conical molding portions opposite each other and said flat upper molding portion opposite the upper end of said lower mold-half and said second shelf, said upper mold-half engaging said washer during closing to form it evenly into a conical shape at full enclosure in the mold cavity.

8. A device for molding a flat leather washer into a shape having an inner frusto-conical lip portion and an outer cylindrical anchor portion, comprising
(1) a lower mold assembly, having
(a) a stationary portion with a generally cylindrical well having an annular upper end with flat annular support means for the outer margin of said washer, and
(b) a lower mold-half yieldably mounted under pressure in said well and having an annular frusto-conical lip-molding surface and a short edge-molding surface, said lower mold-half being movable vertically in said well between an upper position where its upper end is level with said support means and a lower position where said lower mold-half is bottomed in said well, and
(2) an upper mold assembly having
(a) an annular outer member having a central recess, a downwardly extending cylindrical inner portion with a flat low edge, and a surrounding flat annular shelf, and
(b) an inner member yieldably mounted in said recess under greater pressure than that under which said lower mold-half is mounted and having a lower portion projecting out through said recess for engagement with said lower mold-half so as to force said lower mold-half down during mold closure, said lower portion
having first and second tapering side wall portions flaring upwardly and radially outwardly and separated by a cylindrical portion wider than said washer's inner diameter, said second tapering portion and said flat lower edge being molding surfaces respectively facing the said lip-molding surface and edge-molding surface during molding.

9. A device for molding a flat leather washer into a sealing ring or the like having an inner frusto-conical lip portion and an outer cylindrical anchor portion, comprising
(1) a lower mold assembly, having
(a) a stationary base portion with a central generally cylindrical well and an annular upper end having a flat annular shelf for initial support of the outer margin of said washer,
(b) a lower mold-half in said well having a frusto-conical lip-molding surface and a short edge-molding surface, said lower mold-half being movable vertically in said well between an upper position where said upper end of the lower mold-half is level with said shelf, for partial initial support of said leather washer, and a lower position where said lower mold-half is bottomed on said base in said well, and
(c) a first spring in said well compressed between said base and said lower mold-half urging the latter normally to its upper position, and
(2) an upper mold assembly having
(a) an outer annular member with a stepped recess therethrough and with an outer surface providing an outer annular flat shelf that bottoms against the upper end of said base portion of said lower mold assembly, and a cylindrical downwardly extending sleeve portion terminating in an edge-molding lower end,
(b) an inner annular member mounted in said recess and projecting down through and beyond said sleeve portion and providing successively upwardly a flat bottom, a first tapering portion leading upwardly and outwardly from said bottom from a diameter smaller than the inner diameter of said washer, a first cylindrical portion, a flat shelf, a second outwardly tapering portion wider than the inner diameter of the washer, a second cylindrical portion, a frusto-conical molding portion, and a cylindrical upper molding portion slidable in said sleeve portion, and
(c) a second spring heavier than said first spring and urging said inner annular member downwardly away from said outer upper mold member.

10. The device of claim 9 wherein a portion of said well is tapered inwardly and downwardly between two cylindrical portions.

(References on following page)

References Cited

UNITED STATES PATENTS

| | | | |
|---|---|---|---|
| 600,863 | 3/1898 | Genese | 18—19 |
| 1,229,572 | 6/1917 | Bunzweig | 18—19 |
| 1,253,316 | 1/1918 | Weiland | 18—19 |
| 1,454,506 | 5/1923 | Christenson | 18—19 X |
| 1,598,911 | 9/1926 | Hochmuth et al. | 18—19 |
| 1,856,319 | 5/1932 | Cooper | 18—19 |
| 1,858,225 | 5/1932 | Frederick | 18—19 |
| 1,972,789 | 9/1934 | Newkirk | 18—19 X |

WILLIAM J. STEPHENSON, *Primary Examiner.*